FIG.I.

United States Patent Office
3,473,298
Patented Oct. 21, 1969

3,473,298
MOISTURE CONTENT AND COMBUSTION PRODUCT REMOVAL APPARATUS FOR EXHAUST GASES
Paul A. Berman, Plymouth Meeting, Pa., assignor to Westinghouse Electric Corporation, Pittsburgh, Pa., a corporation of Pennsylvania
Filed Dec. 26, 1967, Ser. No. 693,422
Int. Cl. B01d 47/02
U.S. Cl. 55—222                  4 Claims

ABSTRACT OF THE DISCLOSURE

The invention comprises an apparatus for recovering and utilizing water introduced into a steam injection power plant, and for removing moisture content and combustion products from exhaust gases before they are admitted to atmosphere. The apparatus includes means operable in a manner to chill the exhaust gases by directly contacting the gases with water. Solid contaminants and water soluble substances are removed from the gases by the contacting water. Heat exchange apparatus including air to water heat exchangers in a final ambient air mixing section are operable to reduce the relative humidity of the gases before they are admitted to atmosphere. The spray water and the water resulting from condensation is collected and recirculated in the system, the water contained in the exhaust gases being thereby recovered and utilized so that little or no water need be added in the operation of the system.

BACKGROUND OF THE INVENTION

The present invention relates generally to an apparatus for removing air polluting contaminants and condensable vapors from exhaust gases, the system being particularly useful in recovering and conserving water used in steam injection gas turbine power plants, for example, in electrical power generating plants.

In steam injection power plants, the water vapor mixed with the combustion gases, and the water vapor produced by the combustion of fuel in the gas turbine, is lost to the atmosphere with the exhaust gases if no means is provided for the recovery of such water. Further, it is possible for the vapor contained in exhaust gases admitted to the atmosphere to settle near the ground in the form of fog or to condense at higher altitudes and fall out in the form of rain or snow. Thus, the moisture bearing problem is one of both private and public concern. Utilizing water ordinarily lost to the atmosphere is a desirable economy objective, while the prevention of possible fog and snow or rain formation is a desirable public objective.

A further problem with exhaust gases, and one presently receiving a large measure of attention, is that of air pollution. It is desired, and often required by ordinances, that solid contaminants and noxious gases be prevented from entering the atmosphere for obvious reasons. Generally however, such ordinances permit the introduction of vapor into the atmosphere from exhaust stacks. With a relatively high ambient temperature (i.e., 75° F. and above), the vapor will not condense (and fall out) so that no visible vapor plume is formed. However, with low ambient temperature conditions, the vapor will condense and vapor plumes form which are visible above the exhaust stacks.

BRIEF SUMMARY OF THE INVENTION

Briefly, the present invention describes a novel apparatus or system for substantially reducing both the vapor and contamination content of exhaust gases, while simultaneously utilizing water recovered from the vapor contained in the exhaust gases to reduce the contamination content. This is accomplished by a recirculating water system in which the water initially is employed to directly contact and chill the exhaust gases in a spray chamber to effect removal of solid particle and water soluble contaminants. The water is then directed through a condenser for subsequently condensing the remaining vapor entrained in the gases, and to heat exchangers in an air mixing section or region in which ambient air is heated and added to the gases before they are admitted to atmosphere, thereby providing a stack effluent of very low relative humidity.

The water employed to contact the exhaust gases, and the water condensed from the gases, is collected and recirculated through the heat exchangers in the ambient air mixing section, and through the condenser before returning to the spray chamber. The temperature of the water is raised by its contact with the exhaust gases so that, when circulated through the heat exchangers, it functions to heat the ambient air (before it is added to the exhaust gases) with the consequent cooling of the water for return to the condenser and spray chamber to effect its condensing and chilling functions, With such apparatus, as briefly described above, little or no additional water is needed by virtue of the condensing and collecting of the water entrained in the exhaust gases for recirculation in the arrangement disclosed. This is accomplished while simultaneously eliminating vapor and air polluting contaminants from the stack effluent in the public interest.

THE DRAWINGS

The objects and advantages of the invention will be more apparent from consideration of the following detailed description taken in connection with the accompanying drawings in which.

PREFERRED EMBODIMENTS

Figure 1:
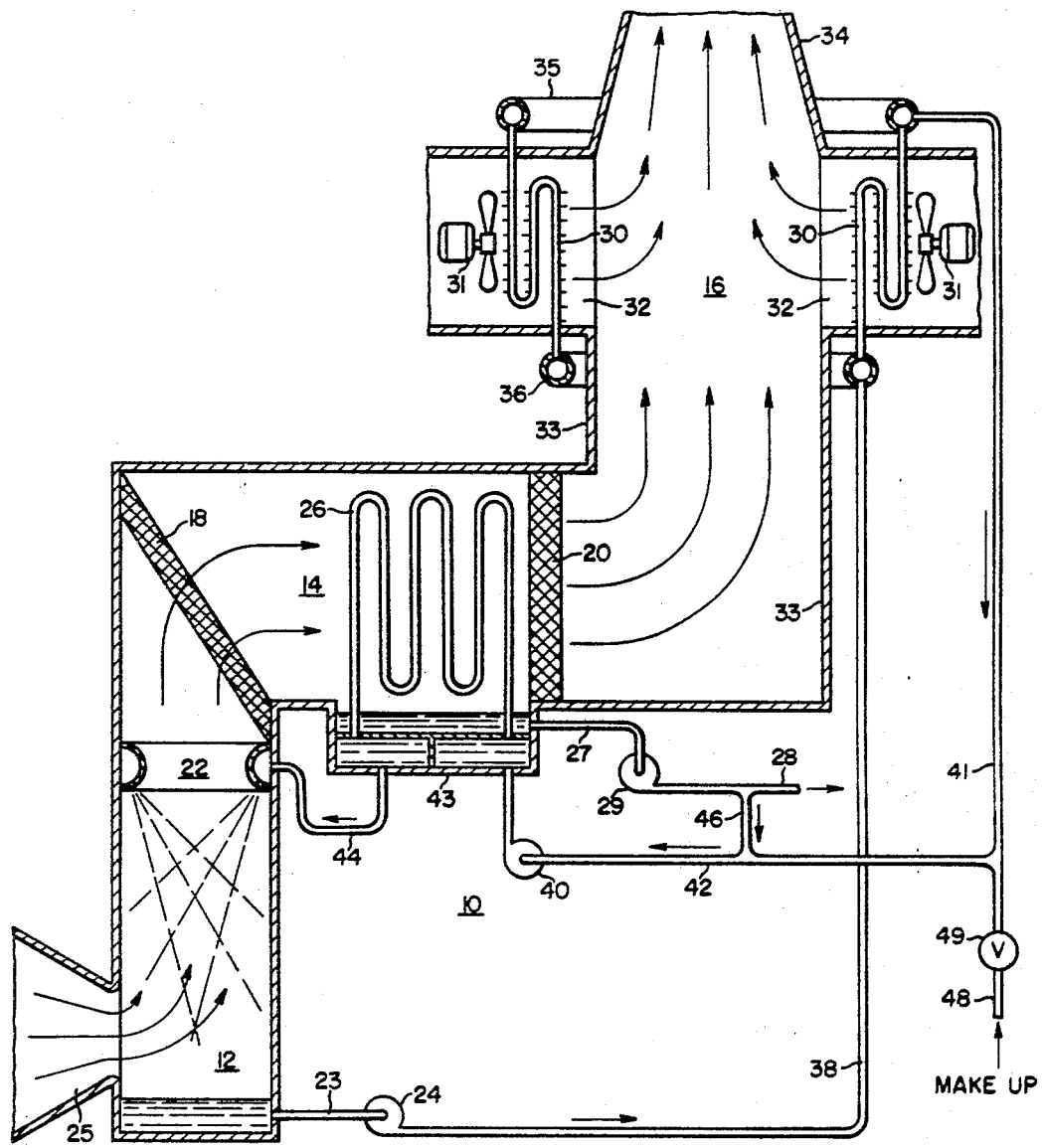
FIGURE 1 is a schematic representation of a structure for removing moisture content and air contaminating products from exhaust gases in accordance with the principles of the invention.

Specifically, there is shown in FIG. 1, a generally schematic representation of a structure 10 effective for recovering water vapor contained in exhaust gases, and for using the water recovered to remove additional vapor and atmosphere contaminating products from the exhaust gases. The structure 10 includes generally a spray chamber 12, a condensing section 14 and a final, ambient air mixing section or region 16 the chamber and section being located upstream from each other in the order named. The chamber and sections are separated from each other by moisture separators or demisters 18 and 20, respectively.

The spray chamber 12 contains nozzle structures 22 for directing water into the chamber in finely divided form. The water is collected in a lower portion of the chamber for recirculation by a conduit 23 and pump 24. The chamber is further provided with a flanged inlet opening 25 for receiving water vapor containing exhaust gases from say a steam injection, gas burning turbine (not shown) though the invention is not limited thereto. The exhaust gases enter the structure 10 at 25, and pass through the chamber 12 and the sections 14 and 16 before they are admitted to atmosphere.

The condensing section 14 is provided with a suitable surface heat exchanging or condensing tube structure 26 for cooling and thereby condensing vapor entering the section. The resulting condensate is collected in the bottom of the section for removal therefrom by suitable conduits 27 and 28 and a pump 29.

The final, ambient air mixing section or region 16 includes finned air to water heat exchangers 30 and motor driven fans 31 mounted in atmospheric air inlet openings 32 provided in the vertical wall structure 33 forming the lower portion of a stack structure 34 (only partially shown) for directing the exhaust gases to atmosphere.

The finned heat exchangers 30 are connected together by upper and lower manifolds or headers 35 and 36 respectively. The lower header 36 is connected to the pump 24 by a conduit 38 while the upper header 35 is connected to a pump 40 by conduits 41 and 42, the headers and conduits forming part of a water recirculation system.

The pump 40 is connected to one end of the condensing tube structure 26 through the right-hand portion of a water box structure 43 disposed immediately beneath the condensing section 14 and tube structure 26. The recirculation system is completed to the nozzle structure 22 in the spray chamber 12 by the condensing tube structure having its other end connected in fluid communication with the left-hand portion of the water box 43, and a conduit 44 connecting said portion to the nozzle structure 22.

In operation, water vapor bearing hot exhaust gases are directed into the spray chamber 12 through the flanged opening 25. The gases are directly contacted with water in finely divided form directed from the spray nozzle 22, the water functioning to cool the gases and to remove exhaust products from the gases in a manner presently to be explained.

The extent of exhaust gas cooling in the spray chamber 12 is substantial so that some of the water vapor contained in the gases condenses out to be collected with the water spray in the bottom of the chamber for recirculation in the system 10. When the water spray contacts the hot exhaust gases, additional vapor is formed, by virtue of the latent heat of vaporization of the water, which vapor travels with the gases, and any vapor remaining therein, towards the next (condensing) section 14. The demister 18, separating the spray chamber 12 and condensing section, serves to remove water droplets entrained in the gases for collection in the spray chamber with the unevaporated portion of the water spray.

In the spray chamber 12, the exhaust gases are cleaned of air polluting gases and solid particles. The direct contact of the water spray performs a scrubbing or washing action on the exhaust gases which strips particulate matter from the gases. The spray water, in addition, combines with water soluble gases, such as $SO_2$ and $SO_3$, contained in the exhaust gases to form sulphurous and sulphuric acids which acids are collected with the water spray in the chamber 12.

The exhaust gases travel from the spray chamber 12 to the condensing section 14 where the gases are further cooled as they flow past the condensing tube structure 26. More water, such as that evaporated in the spray chamber 12, is removed from the exhaust gases by being condensed and collected for removal from the section 14 by the conduit 27 and pump 28.

From the condensing section 14 the exhaust gases pass through the demister 20, where remaining water droplets are removed, before reaching the ambient air mixing section 16. From outside of the stack 34, air at ambient temperature, is directed over the heat exchangers 30 and into the section 16 by the fans 31 for adding to and mixing with the exhaust gases. The heat exchangers 30 heat the relatively cool air before it is mixed with the exhaust gases in a manner presently to be explained.

The adding of ambient air with the exhaust gases dilutes the gases in such a manner that their relative humidity is reduced to a very low level. Thus, the gases leaving the stack 34 will have such a low relative humidity value that a visible vapor plume will not be formed even on very cold days, and the possibility of moisture fall out from the gases is essentially eliminated.

As mentioned earlier, the spray water and the water vapor removed from the exhaust gases in the chamber 12 are collected therein for recirculation in the system 10. For this reason, little or no additional water is needed for the system. The temperature of the water is relatively high by virtue of the high temperature of the exhaust gases. This high temperature water is directed from the bottom of the chamber 12 by the pump 24 to the heat exchangers 30 via the conduit 38 and the lower header 36. In the heat exchangers 30, the hot water is effective to heat the ambient air directed over them by the fans 31 while the directed ambient air is effective to cool the hot water in the heat exchangers.

From the heat exchangers 30, the water is collected by the upper header 35 and directed to the condensing tube structure 26 by the pump 40 and the conduits 41 and 42. In the condensing tubes, the water, cooled in the heat exchangers 30, performs its cooling function on the exhaust gases passing over the tube structure as explained above.

From the condensing tube structure 26, the water is directed to the nozzles 22 by the conduit 44, the nozzles directing the water against the exhaust gases entering the chamber 22. Thus, the recirculation path for the water collected in the bottom of the chamber 12 is completed.

The water in the recirculation system thus far described is maintained at a suitable relative impurity level by withdrawing the water collected in the condensing section 14. The impure water, which includes the contaminants stripped from the exhaust gases in the chamber 12, is withdrawn from the condensing section and ejected by the pump 29 via the conduits 27 and 28.

A conduit 46, connecting the output of the pump 29 to the recirculating conduit 42, is provided for returning a small portion of the water withdrawn from the condensing section to the system to replenish water which may be lost to the exhaust gases with the evaporation of a portion of the water spray by said gases in the chamber 12. The major portion of the impure water, however, is removed from the system via the conduit 28.

The recirculation system is first charged by admitting water through an input conduit 48 and a valve 49, after which the valve is closed, and the system functions as a closed system. Makeup water may be added to the system by opening the valve 49 if or when the amount of recirculating water falls below a predetermined level.

Figure 2:
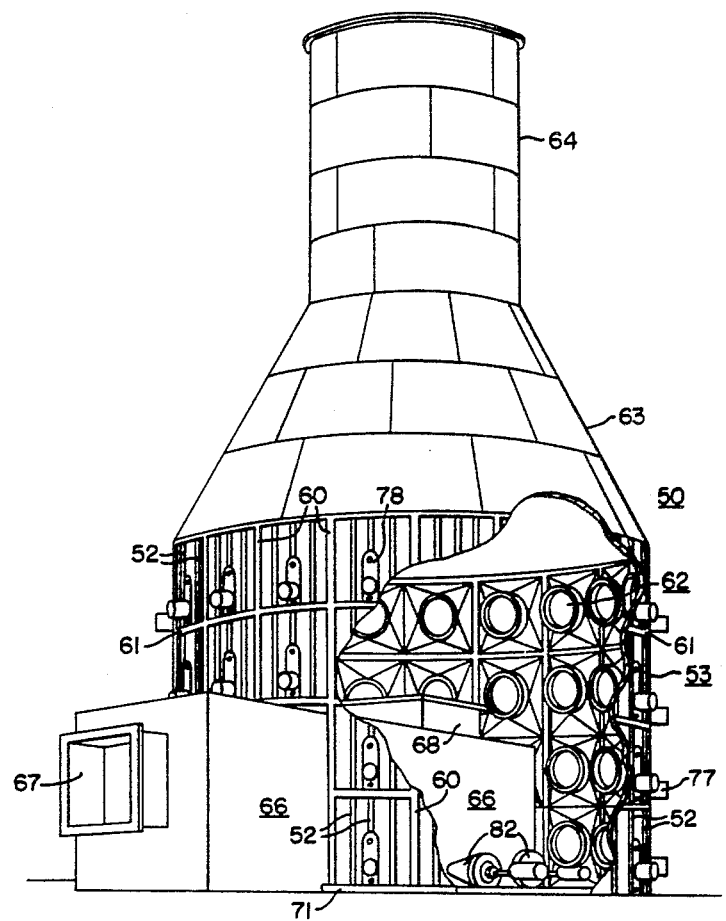
FIG. 2 is a perspective view of a structure, with portions cut away, operable in the manner of FIG. 1.
Figure 3:
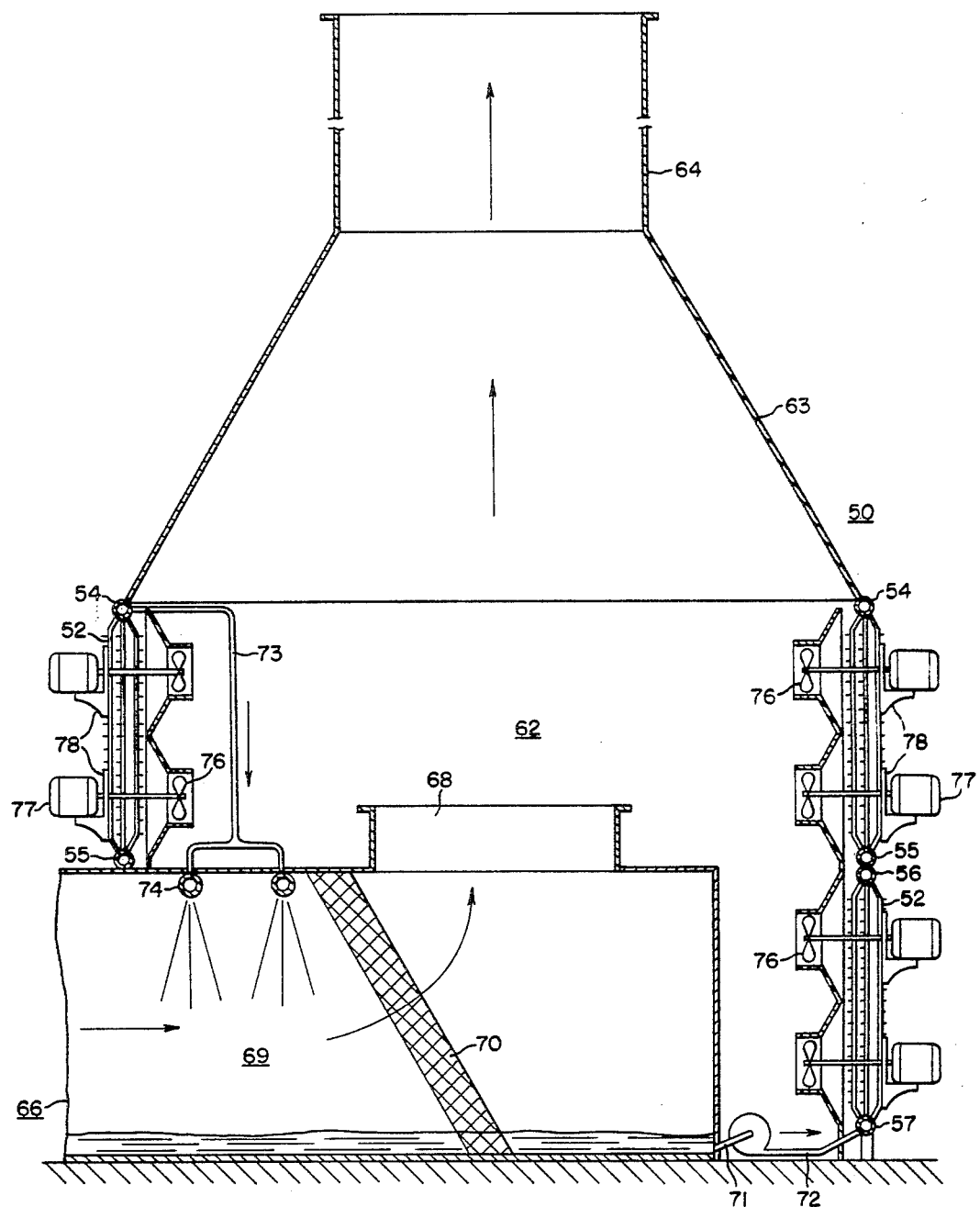
FIG. 3 is a sectional view taken along the vertical axis of the structure depicted in FIG. 2.

A preferred structural embodiment of the invention thus far described is shown in FIGS. 2 and 3.

FIG. 2 shows a perspective view of a preferred embodiment in which a large stack structure, generally designated 50, is provided to enclose apparatus for receiving exhaust gases, and for eliminating the water vapor content and air polluting substances in the exhaust gases in the manner described above or in a similar manner.

Preferably, the lower portion of the stack 50 comprises finned heat exchanging tubes 52 vertically disposed and circumferentially spaced to form a large cylindrical enclosure structure generally designated 53. Thus, the tubes 52 form a porous, heat exchanging wall which forms the lower portion of the stack 50 as best seen in FIG. 2.

The tubes 52 may be divided into upper and lower sections and connected between headers 54 and 55, and 56 and 57, respectively, as shown in FIG. 3. The tubes and headers correspond to the heat exchangers 30 and headers 35, 36 shown in FIG. 1 and described above.

The tubes 52 and headers 54 to 57 may be attached to and supported by a rigid, cylindrical, steel frame structure having straight, vertically disposed members 60 and circular, horizontally disposed members 61, the members 61 extending peripherally about the outside of the tubes 52 as shown in FIG. 2. A portion of the supporting steel frame structure and the heat exchanging tubes 52 in FIG. 2 are broken away to show partially the internal region thereof, the internal region forming essentially the ambient air mixing section 16 described above in connection with FIG. 1. The internal region or ambient air mixing section is designated by numeral 62 in FIGS. 2 and 3.

The rigid steel structure further supports an intermediate stack structure 63 converging towards a topmost stack structure 64 from which the exhaust gases finally emerge into the atmosphere.

A rectangular duct structure 66 is provided which extends from outside of the stack 50 into the enclosed ambient air mixing section 62 of the stack through a portion of the heat exchanging wall 53. The duct structure has a flanged inlet opening 67 on the outside of the stack 50 for receiving the exhaust gases from a steam injection power plant, for example, and a flanged outlet opening 68 communicating with the interior of the stack for permitting the exhaust gases to flow into the ambient air mixing section.

The duct 66 may be constructed to house a spray chamber and a condensing section as described above in connection with FIG. 1, or the duct may only house a spray chamber 69 and a moisture separator 70 as shown in FIG. 3.

Connecting the bottom portion of the duct structure 66 to the lowermost header 57 are conduits 71 and 72 as seen in FIG. 3, the conduits 71 and 72 corresponding to the conduits 23 and 38 shown in FIG. 1. In a similar manner, a conduit 73 returns the water to spray nozzles 74 in the chamber 69 from the uppermost header 54.

Peripherally mounted around the inside of the heat exchanging tubes 52 forming the cylindrical wall structure 53 are four rows of fans 76, corresponding to the fans 31 described above in connection with FIG. 1. The fans are driven by a corresponding number of motors 77 mounted on the outside of the heat exchanging tubes 52 by brackets 78 suitably secured to the tubes.

Around the blades of each fan 76 is disposed a cylindrical shroud structure 79 and supporting sheet metal structure 80 for collecting the ambient air from the tubes 52 and directing it into the air mixing section 62. The supporting sheet metal and shroud structures thus form four circular arrays of air directing structures disposed about the inside of the heat exchanging wall 53, the sheet metal stuctures 80 being suitably attached to the structural steel members 60 and 61 or to the tubes 52 or both.

The operation of the embodiment shown in FIGS. 2 and 3 is similar to that described in FIG. 1. Water vapor bearing exhaust gases entering the duct structure 66 are contacted and cleaned by the relatively cool water spray from the nozzles 74. The moisture separator 70 removes water droplets entrained in the gases as they travel through 70 enroute to the air mixing section 62 through the outlet opening 68 provided in the duct 66.

The condensing tubes 26 (FIG. 1) are not shown in the embodiment of FIG. 3 though they may be included in the duct space to the right of the moisture separator 70. If included, they would function in the manner described above in connection with FIG. 1.

In the mixing section 62, outside ambient air is added to the exhaust gases as they leave the opening 68 in the duct 66, thereby lowering the relative humidity of the gases for direction to atmosphere from the upper stack portion 64. The ambient air is drawn through the heat exchanging wall 53 (formed by the heat exhange tubes 52) from the outside into the section 62 by the fans 76.

The water spray, along with the water vapor condensed thereby, and the contaminants are collected in the bottom of the duct structure 66 as shown in FIG. 3, and circulated by pumps 82 (FIG. 2) through the heat exchange tubes 52 where the water serves to heat the ambient air passing through the wall 53 and over the tubes 52 as explained above. The water, in turn, is cooled in the tubes 52 by the flow of ambient air, and returned to the spray nozzles 74 in the duct 66 by conduit 73.

The relative impurity of the recirculated water is controlled by removing a portion of collected water from the duct 66 or from the condensing section 14, if used, in the manner described above in connection with FIG. 1.

From the foregoing description it should now be apparent that new and useful structure and method have been disclosed for removing water vapor and contamination content from the water vapor bearing exhaust gases while simultaneously recovering and using the water in the gases to effect the moisture-contaminant removal. This is accomplished by condensing the water vapor contained in the gases, and using the relatively hot water thus attained to heat ambient air for adding to the exhaust gases before they are admitted to atmosphere. The condensing process includes a water washing process which strips the contaminants from the gases for collection and removal from the system. With such means and methods, rain or snow and fog forming moisture and air polluting contaminants are removed from the exhaust gases in an economical manner.

Though the invention has been described with a certain degree of particularity, it is to be understood that the embodiments herein presented are made by way of example only and that changes may be made therein without departing from the spirit and scope of the invention.

I claim:

1. An integral stack structure and apparatus for removing water vapor and solid particle and water soluble gas contaminants from hot, humid exhaust gases, and for using the water vapor removed from the gases in the stack and apparatus, the stack and apparatus comprising
   a duct structure having an inlet portion for receiving the exhaust gases, and an outlet portion for directing said gases therefrom,
   nozzle means in said duct structure for directing water against the gases to cool the gases and thereby condense at least a portion of the water vapor, said water directed against the gases being further effective to remove the solid particle and water soluble gas contaminants from the gases,
   said duct structure being arranged to collect the condensate, the contaminants and at least a portion of the water directed against the gases,
   heat exchange structure forming an integral part of the stack structure, said heat exchange structure comprising a plurality of spaced apart, liquid conducting tubes arranged to form a substantially vertical wall structure about at least a portion of said duct including its outlet portion, said wall structure providing a stack region for receiving the exhaust gases from said duct structure before they are directed to atmosphere,
   means for directing ambient air through the spaces between said tubes into said region to reduce the relative humidity of the exhaust gases, and
   conduit means for recirculating the water and condensate collected in the duct structure through the heat exchange tubes and to the nozzle means in said duct structure.

2. The structure recited in claim 1 in which the heat exchange wall structure comprising the spaced apart tubes forms the lower portion of the stack structure,
   said stack structure having an upper portion for directing the exhaust gases to atmosphere,
   the upper portion having a cross section less than that of the lower portion.

3. The structure of claim 1 in which the ambient air directing means includes a plurality of fans peripherally disposed about the inside surface of said wall structure.

4. The structure of claim 1 in which the ambient air directing means include a plurality of fans peripherally disposed about the inside surface of said wall structure, and
an air directing shroud structure disposed about each of said fans.

References Cited

UNITED STATES PATENTS

| | | | |
|---|---|---|---|
| 3,237,381 | 3/1966 | Hvostoff et al. | 55—89 |
| 3,260,035 | 7/1966 | Wheelock et al. | 55—73 |
| 3,260,189 | 7/1966 | Jensen. | |
| 3,320,906 | 5/1967 | Domahidy | 261—17 |
| 3,325,973 | 6/1967 | Illingworth | 55—90 |
| 3,395,512 | 8/1968 | Finney et al. | |
| 3,395,656 | 8/1968 | Ford et al. | |

REUBEN FRIEDMAN, Primary Examiner

C. N. HART, Assistant Examiner

U.S. Cl. X.R.

55—257, 268